United States Patent [19]

Stroobants et al.

[11] 4,181,050

[45] Jan. 1, 1980

[54] CAN CUTTING APPARATUS AND METHOD

[75] Inventors: Alphonse Stroobants, Lynchburg; Daniel S. Cvacho, Forest, both of Va.

[73] Assignee: Belgium Tool & Die Company, Lynchburg, Va.

[21] Appl. No.: 884,981

[22] Filed: Mar. 9, 1978

[51] Int. Cl.[2] .......................... B23B 3/06; B23B 7/00; B23B 3/04

[52] U.S. Cl. ......................................... 82/56; 82/48; 82/82

[58] Field of Search ................... 82/47, 48, 52, 53, 54, 82/56, 57, 58, 82, 83, 85

[56] References Cited

U.S. PATENT DOCUMENTS

| | | | |
|---|---|---|---|
| 2,350,535 | 6/1944 | Sarulla | 82/47 |
| 3,400,620 | 9/1968 | Armbruster et al. | 82/52 |
| 3,878,743 | 4/1975 | Melind | 82/54 |
| 3,894,455 | 7/1975 | Stroobants | 82/58 |
| 3,916,740 | 11/1975 | Stroobants | 82/56 |

*Primary Examiner*—Harrison L. Hinson
*Attorney, Agent, or Firm*—Mason, Fenwick & Lawrence

[57] ABSTRACT

A can end trimmer has a main rotary support shaft with a radial turret plate. A plurality of self-contained cutter unit cartridge assemblies have radial head flanges directly connectable to one side of the turret plate with driven members in each cutter unit cartridge automatically engaging control members mounted on the turret plate for effecting movement of a transversely shiftable cutter knife into engagement with an axially fixed cutter knife for effecting rotation of both knives to trim the end from a can held in a vacuum chuck. A shim between the cutter unit cartridge and the turret plate cants the axes of the knife members with respect to the can by a very small amount normally less than 2.0 degrees to effect a smooth burr-free cut of the can end. Stripper pin means surrounds the can being cut which in turn surrounds the axially fixed knife with a reciprocating stripper plate on the pins being easily removed during replacement of the cutter cartridge unit. Substantial space is saved by the arrangement of the units on the turret plate so that a large number of cutter cartridge units can be employed on a support shaft of a given size.

18 Claims, 15 Drawing Figures

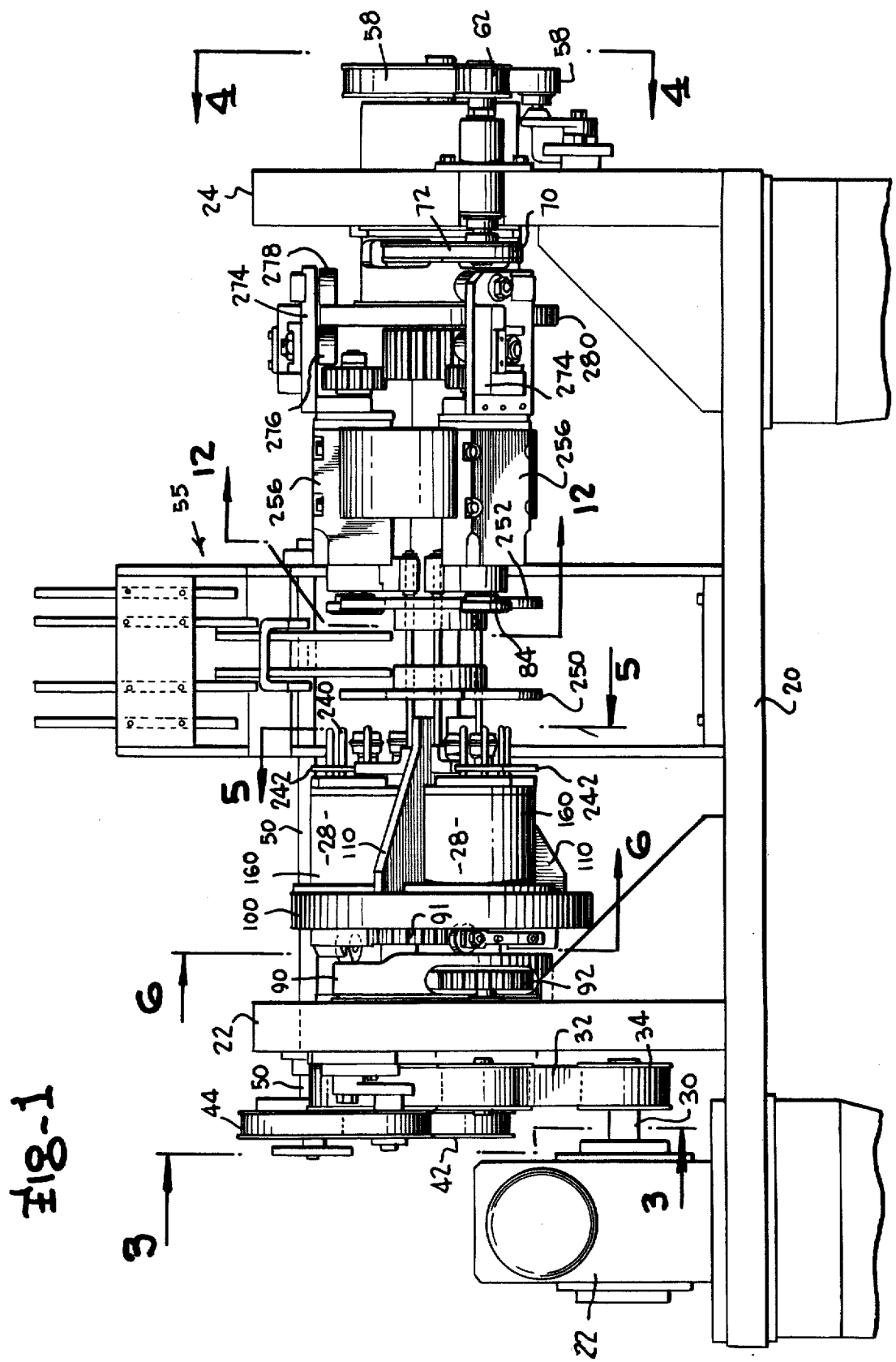

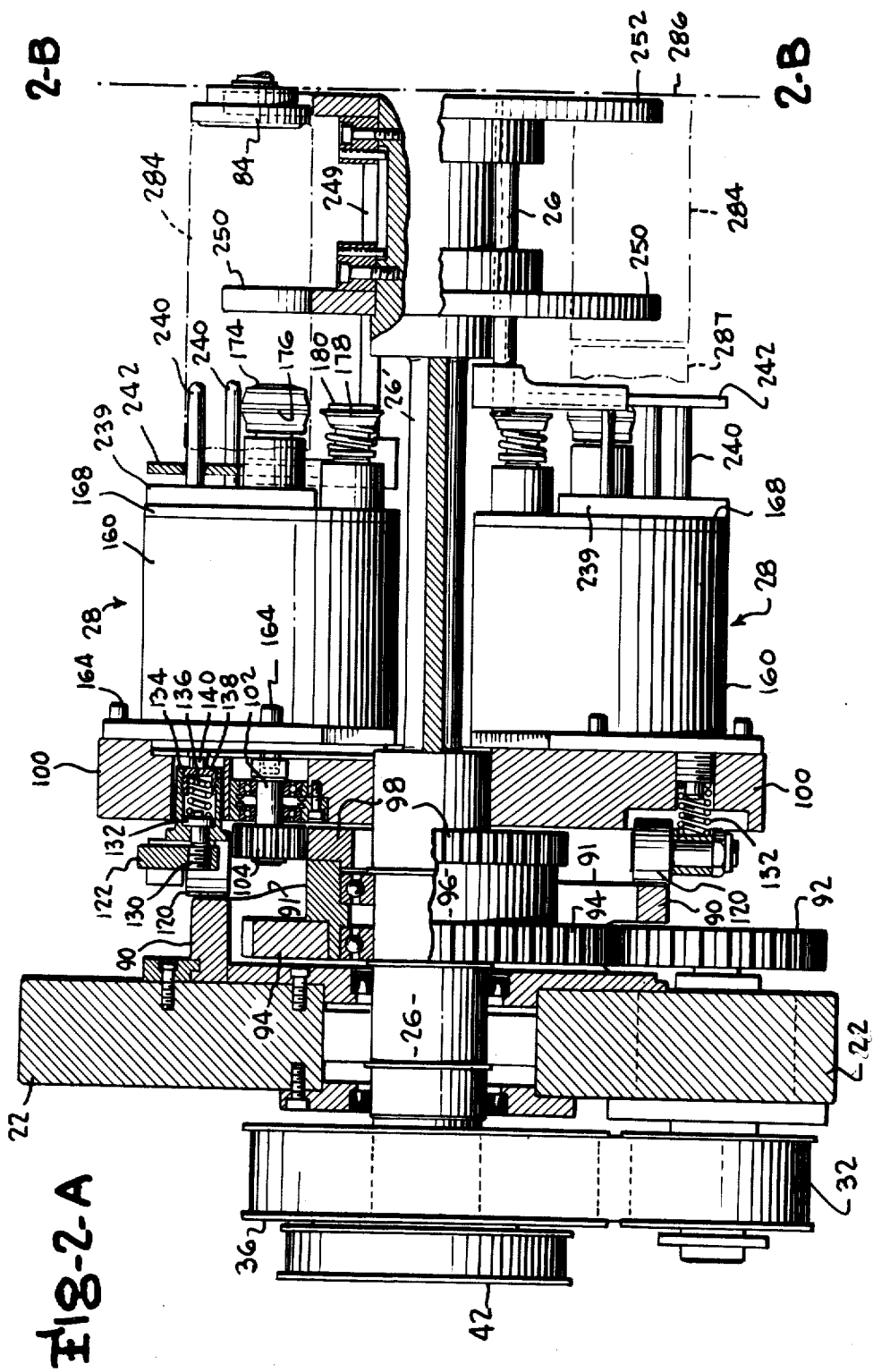

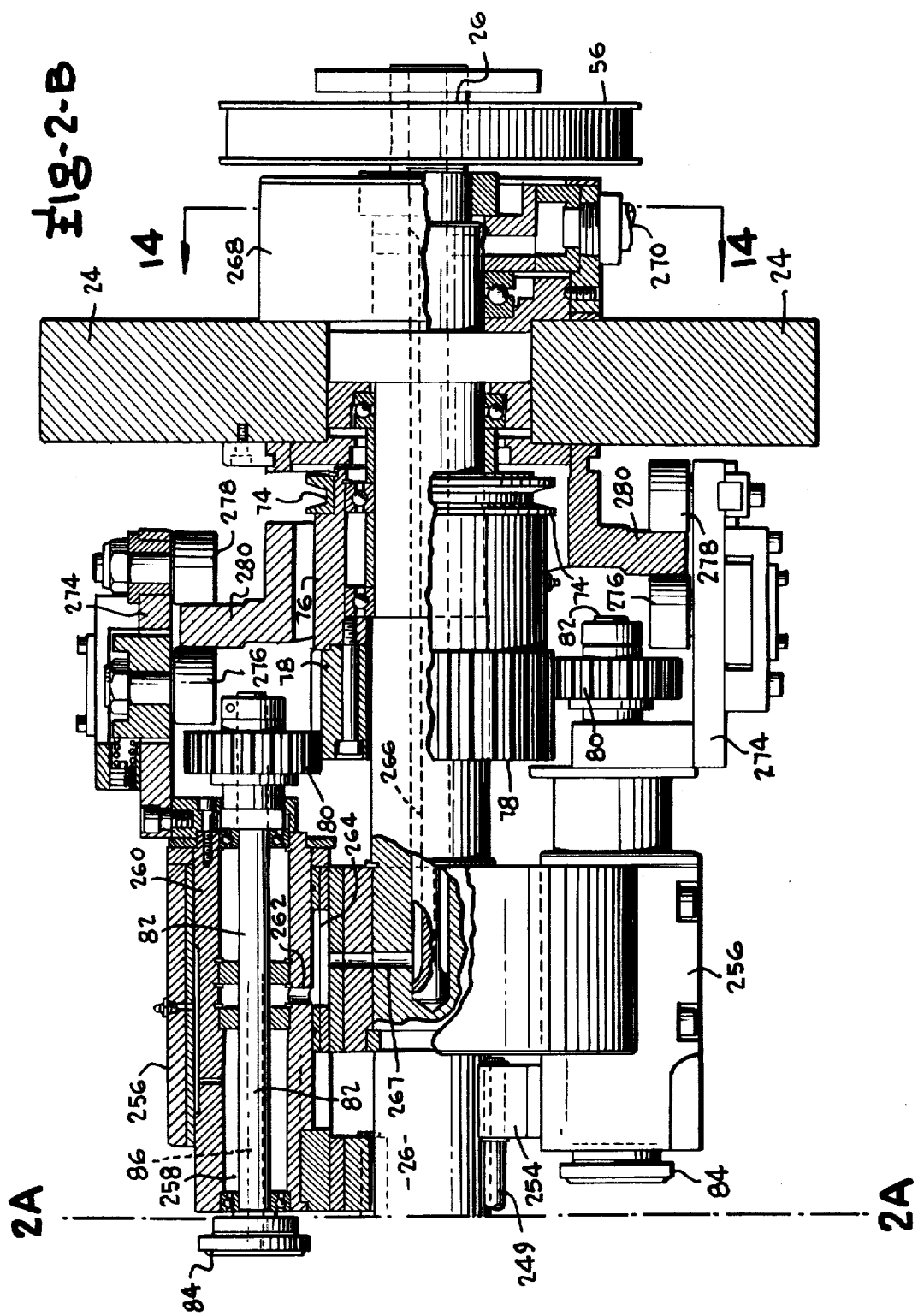

CAN CUTTING APPARATUS AND METHOD

This invention is in the field of cutting and trimming apparatus and is more particularly directed to a new and improved apparatus for trimming the ends of cylindrical cans or the like.

In the manufacture of metal cans, it is conventional practice to form an unfinished can or container of cylindrical configuration consisting of a bottom and a cylindrical side wall which is open on the top end. Such unfinished can members can be formed by a variety of processes such as drawing and ironing to provide the unfinished container. After the container has been formed, it is necessary to trim the upper end of the container to achieve a finished container having a desired height and also having a smooth upper edge termination permitting connection to a top member. It is essential that the upper edge termination be essentially flawless since the upper edge is subsequently subjected to an outward flanging process for enabling the connection of the top to the container. Any burrs, cracks or the like in the edge termination can prevent obtainment of a good seal between the top and the can in the flange area so as to render the can useless and to also result in the waste of its contents.

Numerous prior art devices such as those in U.S. Pat. No. 3,894,455 have evolved for the purpose of trimming the ends of unfinished containers. However, all of the presently known conventional devices employed in trimming can ends suffer from one or more deficiencies and/or drawbacks. For example, some of the prior art devices have initially positioned the unfinished can on a mandril for cutting by an external cutter moved inwardly into engagement with the outer surface of the can and traversed about the periphery of the can for effecting the cutting of the can end. Devices of this type have not provided satisfactory operation due to the fact that the cutting operation frequently results in burrs, cracks and other imperfections in the upper edge portion of the container wall which are enlarged during the subsequent flanging of the can ends prior to the application of the top to the can body.

Other devices have evolved in an effort to achieve a more perfect can trimming operation. For example, another type of device employs a circular knife having an inner cutting edge with the can being positioned inside the circular knife member followed by the subsequent positioning of an internal knife inside the can which is then moved outwardly to effect a cutting cooperation with the external knife member. A primary drawback of devices of this type is that they are quite complicated and expensive to manufacture and service; moreover, the exact positioning of the knife members necessary for a satisfactory cut is difficult to achieve in devices of this type.

While previously mentioned U.S. Pat. No. 3,894,455 and other patents of the inventor therein have represented a substantial improvement over prior known can trimming devices, there are several areas in which further improvements are desirable. For example, the device of the aforementioned patent represents a substantial improvement over the prior art devices in which the cutter members are integrally built into the machine and the failure of any part of the cutter means requires a time consuming disassembly for repair purposes in that the device of the aforementioned patent provides for a relatively easily removable cutter unit. However, the removable cutter unit and the associated actuator means for its components such as illustrated in FIG. 7 of said patent occupy a substantial amount of space about the periphery of the main supporting shaft and it is consequently impossible to employ more than two such cutter units on the shaft. It would be desirable to be able to employ three or more cutter units on a shaft of the same size to provide for increased speed of operation and the present invention is directed to an apparatus in which the size of the cutter unit cartridges is reduced so that three or more cutter unit cartridges can be mounted on a main support shaft of no greater size than was required for mounting two of the units of the type disclosed in the aforementioned patent.

Another problem encountered in the use of the devices of the aforementioned U.S. Pat. No. 3,894,455 and other similar cutters employing mating rotary cutter knives is that they sometimes produce an unwanted outwardly extending burr when used to cut different types of cans of different sizes and/or different materials. While adjustment of the devices can usually cure this problem, such adjustments are time consuming and result in a substantial amount of down time. This invention solves the aforementioned problem to a large extent by a very simple expedient which will be discussed hereinafter.

Therefore, it is the primary object of this invention to provide a new and improved can trimming apparatus.

A further object of this invention is the provision of a new and improved can trimming apparatus in which an increased number of cutter unit cartridges can be accommodated on a common support shaft of a given size.

A further object of this invention is the provision of a new and improved can trimming apparatus providing a more smooth and perfect cutting of the can ends.

Achievement of the foregoing objects is enabled by the preferred embodiment of the invention through the provision of a main rotary shaft supported for rotation about a horizontal axis by frame means with the shaft including a radially extending turret plate. Three cutter unit cartridges are mounted on the turret plate equidistantly about the periphery of the shaft with the connection of each cutter unit cartridge being effected solely by connection of one end of the cartridge to the turret plate.

A fixed cam is positioned on the machine frame adjacent the turret plate and actuates a cam follower mounted on the plate for each of the cutter unit cartridges to reciprocate a knife actuating member of each cartridge extending through an opening in the turret plate. Operation of the knife actuator in each specific cutter unit cartridge effects the moving of a transversely swingable knife shaft to bring a knife member on the end of the shaft into contact with a similar knife on an axially fixed shaft carried in the cutter unit cartridge; both knife members are driven by an output drive on the turret plate. None of the actuating means on the turret plate extends outwardly beyond the periphery of the cutter unit cartridge and a substantial savings in space as compared to the cutter unit cartridges in previously mentioned U.S. Pat. No. 3,894,455 is consequently achieved.

Additionally, the mounting of each of the cutter units by engagement of a head flange on each of their housings with the turret plate permits an easy removal and/or replacement of the cutter knife units as required for servicing. The turret plate additionally includes a driven rotary female drive connector which meshes with a mating male drive connector on the cutter unit for rotating the two cutter blades of the cutter unit cartridge. The necessary connections to the cam controlled and gear driven support members for the knife members per se are automatically effected by simply mounting the cutter cartridge on the turret plate.

Another significant aspect of the preferred embodiment resides in the fact that the can end to be trimmed is positioned about the axially fixed cutter blade with the movable cutter blade being swung transversely inwardly against the outer surface of the can for effecting the cutting operation, while in previous devices, the exact opposite construction has been employed. More specifically, the previous devices have employed movement of the inside cutter blade outwardly against the inner surface of the wall of the can member. The reverse knife positioning movement of the preferred embodiment is considered to substantially aid in obtaining a more uniform and smooth trimmed can end edge.

Additionally, the cutter blades are mounted on shafts canted less than 1° from the axis of the can being cut which canting has been found to significantly reduce burring of the cut edge.

Another feature of the preferred embodiment resides in the provision of a plurality of stripper pins positioned on the cutter unit cartridge to substantially encircle a can being trimmed with a stripper plate being mounted for reciprocation on the stripper pins. The stripper plate is received in two parallel slots of a carrier bracket connected to the housing of a vacuum chuck in which the base end of the can being trimmed is positioned. The vacuum chuck housing is reciprocated toward and away from the cutter knives to effect reciprocation of the stripper plate on the stripper pins to remove the trimmed waste ring following the trimming operation. The arrangement of the stripper plate in the slots in the arm of the U-shaped carrier bracket permits the stripper plate to be simply lifted from the carrier bracket when the cutter cartridge unit is removed from the machine. The foregoing construction represents another feature which permits an easy removal of the cutter cartridge unit from the machine.

A better understanding of the subject invention will be enabled when the following written description is considered in conjunction with the appended drawings in which:

FIG. 1 is a side elevation view of the preferred embodiment of the invention;

FIG. 2-A is a longitudinal sectional view of a portion of the preferred embodiment which is contiguous with FIG. 2-B along lines 2-B;

FIG. 2-B is a longitudinal sectional view of a portion of the preferred embodiment which is contiguous with FIG. 2-A along line 2-A;

Figure 4:
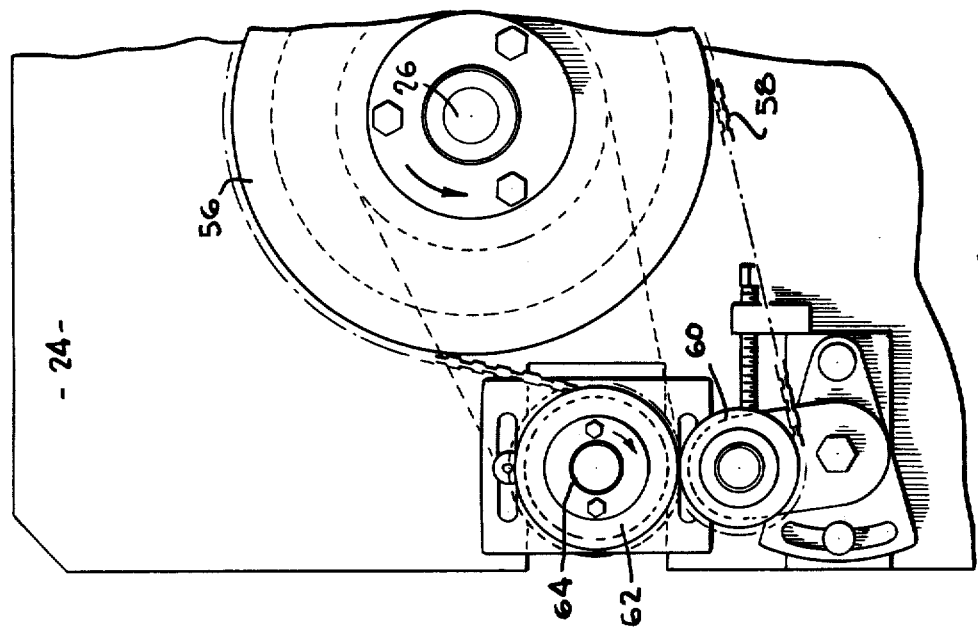
FIG. 4 is a sectional view taken along lines 4—4 of FIG. 1.
Figure 3:
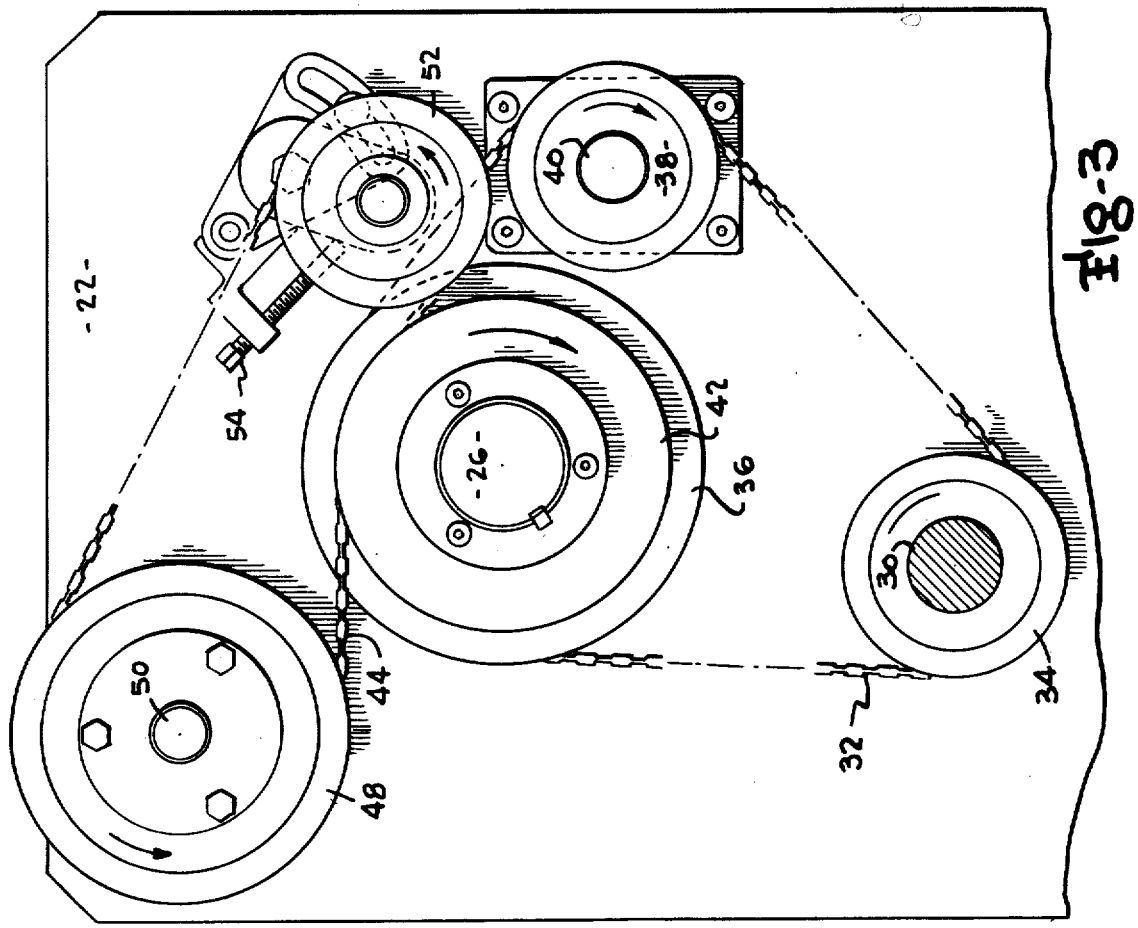
FIG. 3 is a sectional view taken along lines 3—3 of FIG. 1.
Figure 5:
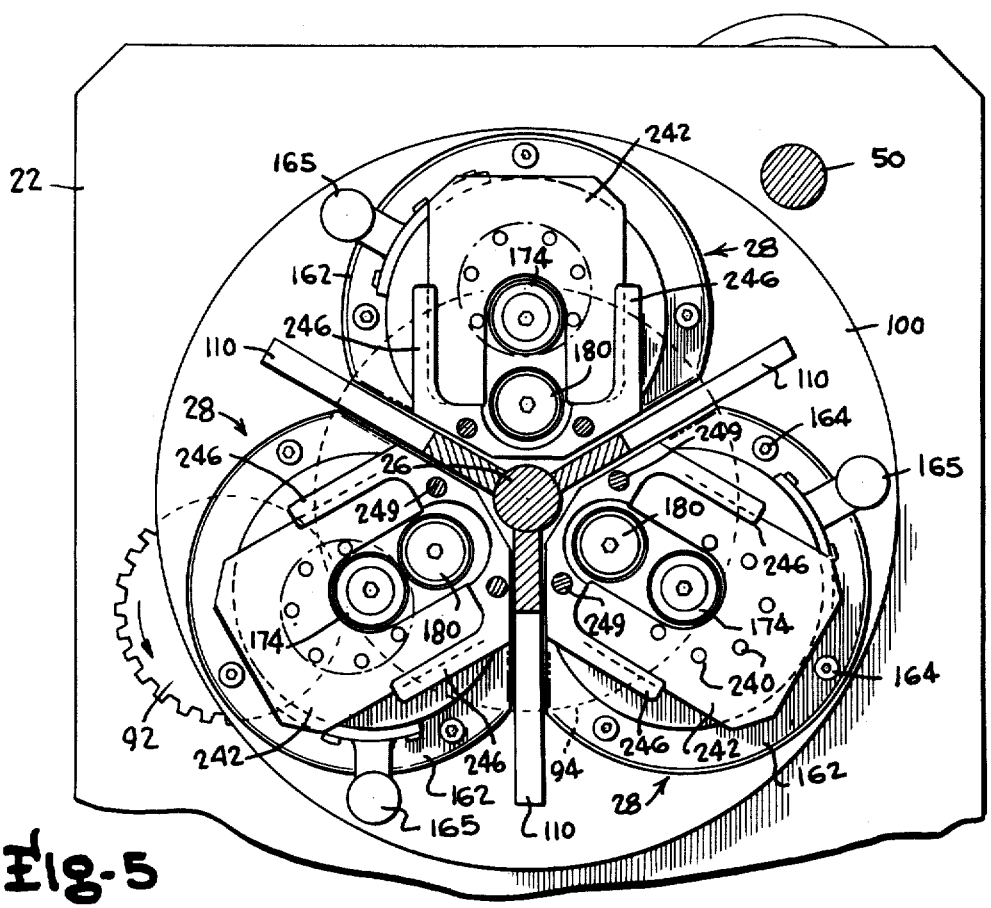
FIG. 5 is a sectional view taken along lines 5—5 of FIG. 1.

Attention is initially invited to FIG. 1 of the drawings which illustrates the preferred embodiment of the invention, generally designated 10, and which includes a main support frame base 20 and first and second spaced vertically oriented heavy pillar plates 22 and 24 between which most of the operative components of the preferred embodiment are positioned and supported as will be discussed in detail hereinafter. More specifically, an elongated main support shaft 26 is supported for rotation in bearings provided in the pillar plate members 22 and 24 with the main support shaft including stations for receiving three cutter unit cartridges 28 each symmetrically positioned about the axis of the shaft and also including can handling means including three associated vacuum chucks for receiving cans to be trimmed by cutting knives on each of the cutter unit cartridges. Drive to the main support shaft is provided from the output shaft 30 of a motor transmission 22 supported on the frame base 20 as shown in FIG. 1 with the output from the shaft 30 being provided to a splined drive belt 32 by means of a splined drive pulley 34 keyed to shaft 30. The splined drive belt 32 extends about a main power input splined pulley 36 keyed to the end of the main support shaft 26 and about a pulley 38 keyed to a shaft 40.

A second splined pulley 42 is keyed to the outer end of shaft 26 outwardly of pulley 36 as shown in FIG. 2-A and engages the outer surface of a splined belt 44 which extends about a pulley 48 mounted on a can feeder drive shaft 50 and a movable adjustment pulley 52, the position of which can be adjusted by means 54 etc. to vary the tension in belt 44. Can feeder drive shaft 50 drives a conventional can feeder assembly 55 (FIG. 1) such as that in prior U.S. Pat. No. 3,916,740.

The opposite end of the main shaft 26 is provided with an output splined pulley 56 over which a splined belt 58 extends as shown in FIG. 4. Splined belt 58 also extends about an adjustable idler pulley 60 with the outer face of the belt 58 engaging a pulley 62 keyed to a chuck drive shaft 64 which extends through the pillar plate 24 and drives a V-belt pulley 70 about which a V-belt 72 extends as shown in FIG. 1. Additionally, V-belt 72 extends about a chuck drive pulley 74 mounted on a chuck drive sleeve 76 mounted for rotation about shaft 26 as shown in FIG. 2-B. Further, a chuck drive gear ring 78 having outwardly facing teeth is fixed to the end of the sleeve 76 for rotation therewith for driving three vacuum chuck drive gears 80 each respectively serving to rotate a chuck shaft 82 on the end of which a vacuum chuck 84 is mounted. There are three vacuum chucks 84 with each chuck being respectively associated in alignment with one of the cutter unit cartridges 28.

Figure 6:
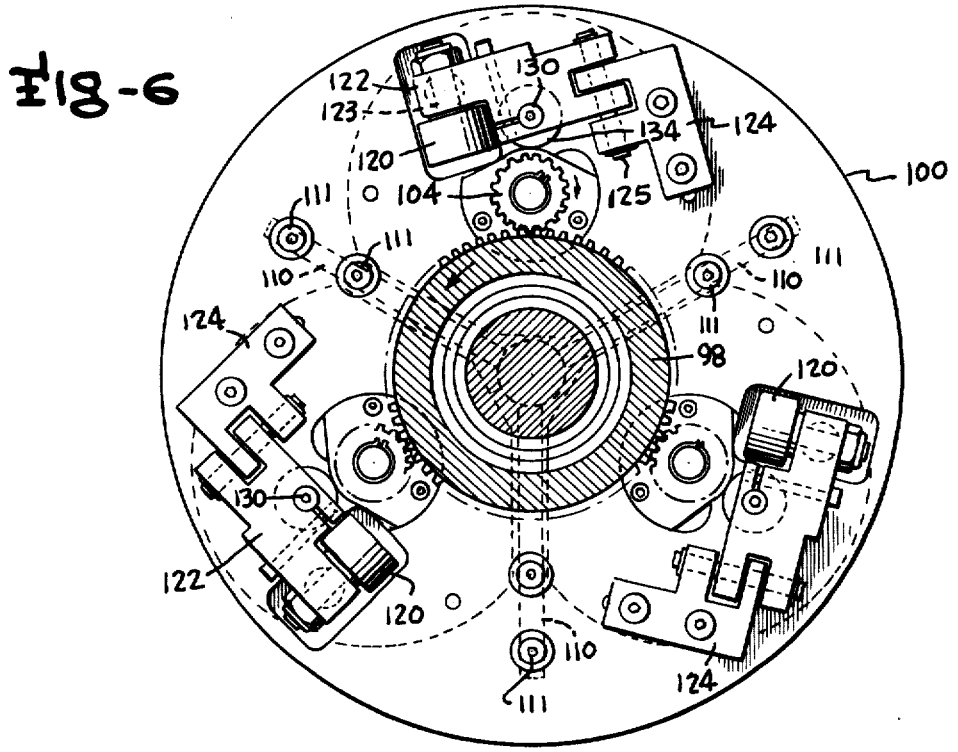
FIG. 6 is a sectional view taken along lines 6—6 of FIG. 1.

A cutter control cam 90 (FIG. 2-A) is fixedly connected to the inner face of the support pullar plate 22 and has a camming surface 91 for controlling the opening and closing movement of rotary cutter knives employed in each of the three cutter unit cartridges 28 which are mounted on shaft 26 in a manner to be discussed. Rotation of the cutter knives of the cutter unit cartridges is provided by an input gear 92 keyed on the end of shaft 40 on the inner side of the pillar plate 22 as shown in FIG. 2-A with gear 92 meshing with a larger gear 94 fixedly attached to a sleeve 96 to which an output gear 98 is also fixedly connected. A rotary turret plate 100 is fixedly connected to the shaft 26 and provides support for three cutter cartridge knife drive shafts 102 mounted in three cutter unit cartridges equidistantly positioned about the periphery of the turret plate 100 and each supporting a gear 104 meshing with the output gear 98 as best shown in FIG. 6.

A reduced diameter portion 26' of shaft 26 is provided immediately to the right of the turret plate 100 with three radial flange plates 110 attached to turret plate 100 by machine screws 111 extending outwardly from shaft portion 26' to define three spaces between the adjacent flange plates 110 with each space defining a cutter unit cartridge mounting station in which one of the cutter unit cartridges 28 is mounted. The three cutter cartridge mounting stations are identical as are the cutter unit cartridges with each station including a cam follower roller 120 mounted on a pivot hinge plate 122 (FIG. 6) supported for pivotal movement on a pin 125 on a hinge bracket 124 fixedly connected to the face of turret plate 100 facing the support pillar plate 22. A compression spring 123 is provided between the pivot hinge plate 122 and the face of turret plate 100 to urge the pivot hinge plate 122 outwardly so that the cam follower roller 120 is forcefully urged against the camming surface 91 of the fixed cutter control cam 90. The shape of the camming surface 91 is such that the roller 120 will be pushed inwardly and outwardly as the turret 100 rotates with the roller 120 following the contour of the camming surface 91. An adjustable threaded pusher stud 130 is mounted in the pivot hinge plate 122 in an adjusted position to engage the end surface of a follower pin 132 having a head flange mounted in a cylindrical slide fitting 134 which is mounted for axial reciprocation in the turret plate 100. Cylindrical slide fitting 134 is hollow on its interior and has a relatively strong compression spring 136 acting between the end wall of a threaded plug 138 and the head flange of the follower pin 132. A bolt having a head 140 is threaded in the threaded plug 138 for engaging the associated cutter unit cartridge 28 to effect movement of the cutter blades into and out of contact in a manner to be discussed. It should be understood that reciprocation of the pusher stud 130 caused by movement of follower 120 over surface 91 effects unitary reciprocation of the cylindrical fitting 134 and the bolt head 140 through the stiff spring member 136. Normally the spring member 136 would not be compressed and it merely serves a safety function by compressing in the event of a jamming or other action resisting movement of the bolt head 140 etc. to the right as viewed in FIG. 2-A.

Each of the cutter unit cartridges 28 includes an outer housing consisting of a cylindrical shell 160 fixedly connected to a head flange 162 having openings 161 and 163 with the head flange being attached to the turret plate 100 by machine screws 164. A handle 165 permits an easy positioning of the cutter unit cartridges for attachment and removal from the machine. Cylindrical shell 160 of the housing includes a transverse inner wall 166 and an end wall 168 connected on the end opposite to head flange 162. A bearing support sheeve 70 is unitarily formed in the end wall 168 and supports bearings which in turn support an axially fixed rotary cutter knife support shaft 172 on the end of which a first axially fixed cutter knife assembly 174 is mounted for rotation with the shaft. Cutter knife assembly 174 includes an annular blade 176 which is engageable with a similar blade 178 on a second cutter knife assembly 180 mounted on a transversely shiftable cutter knife support shaft 182 which is supported in a manner to be discussed for swinging the blade 178 into and out of contact with the first blade 176. The cutter knife members are conventional and can be of the type illustrated in U.S. Pat. No. 3,916,746.

Transverse internal wall 166 of the housing includes an opening defined by a surface 167 which permits the shafts 172, 182 and other associated elements to be positioned in the housing. Specifically, a central portion 169 of the wall 166 supports bearings for the axially fixed shaft 172 and is engaged on opposite sides by thrust bearings 186,188 mounted on shaft 172. Shaft 172 also includes a pinion gear 190 keyed to the shaft and a power input make drive socket 192 on its extreme outer end as shown n FIG. 8. It will be observed that the end portion of axially fixed shaft 172 is positioned in the opening 163 provided in the head flange 162.

Figure 8:
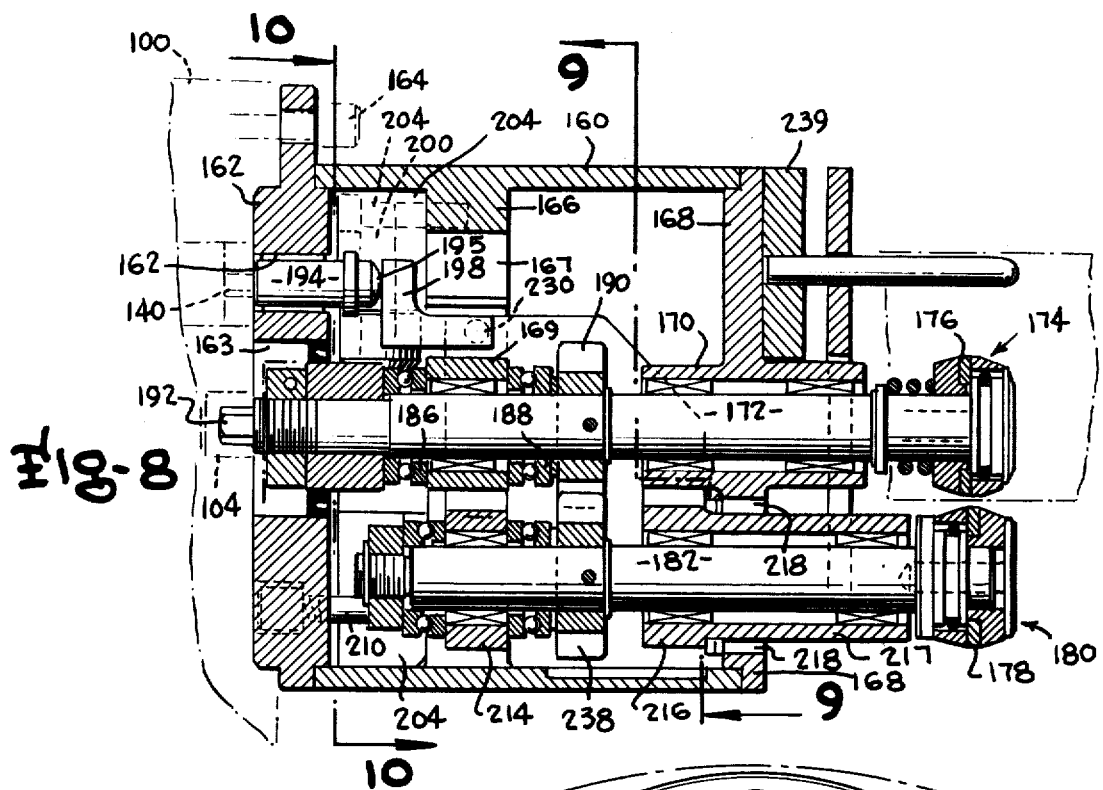
FIG. 8 is a sectional view taken along line 8—8 of FIG. 7 but illustrating a different blade arrangement from that of FIG. 2-A.
Figure 11:
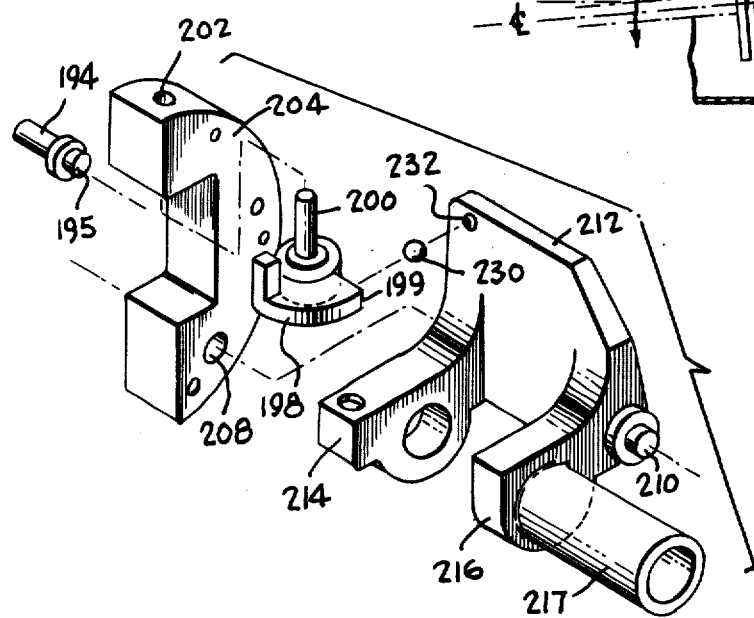
FIG. 11 is an exploded perspective view of a portion of the cutter actuator means employed in the preferred embodiment.

A pusher rod 194 is mounted in the opening 161 of head flange 162 for axial reciprocation as shown in FIG. 8 and has its outer end engageable with the bolt head 140 mounted in the end wall 138 of cylindrical fitting 134 which is reciprocated back and forth in a direction substantially parallel to the axis of shaft 26 by the operation of cam follower 126 rolling on cam 90 as previously discussed. Consequently, the pusher 194 is moved inwardly by the operation of the cam follower 120 etc. The inner end 195 of the pusher rod 194 is rounded and engages a rocket arm 198 supported on a pivot shaft 200 substantially axially perpendicular to the axis of shaft 26 mounted in an opening 202 in a support block 204 as best illustrated in FIG. 11.

Support block 204 is fixedly connected to the transverse internal wall 166 by machine escrews 206. The lower end of the support block 204 includes a pivot shaft receiving opening 208 in which a pivot shaft 210 pivotally supporting a rockable cutter shaft support 212 (FIG. 11) is received.

The rockable cutter shaft support 212 includes first and second arm portions 214 and 216 with arm portion 216 having an extension 217. Arm portions 214, 216, 217 are provided with axially aligned bores in which bearing members are provided for supporting the second transversely shiftable cutter knife support 182 as best shown in FIG. 8. It should be observed at this point that the end wall 168 is provided with an opening 218 providing substantial clearance about the extension portion 217 of the second arm 216 as shown in FIG. 8 so as to permit the extension portion 217 to having swinging movement about the axis of pivot shaft 210 in the opening 218 for effecting movement of the blade 178 into and out of contact with the blade 176.

Figure 9:
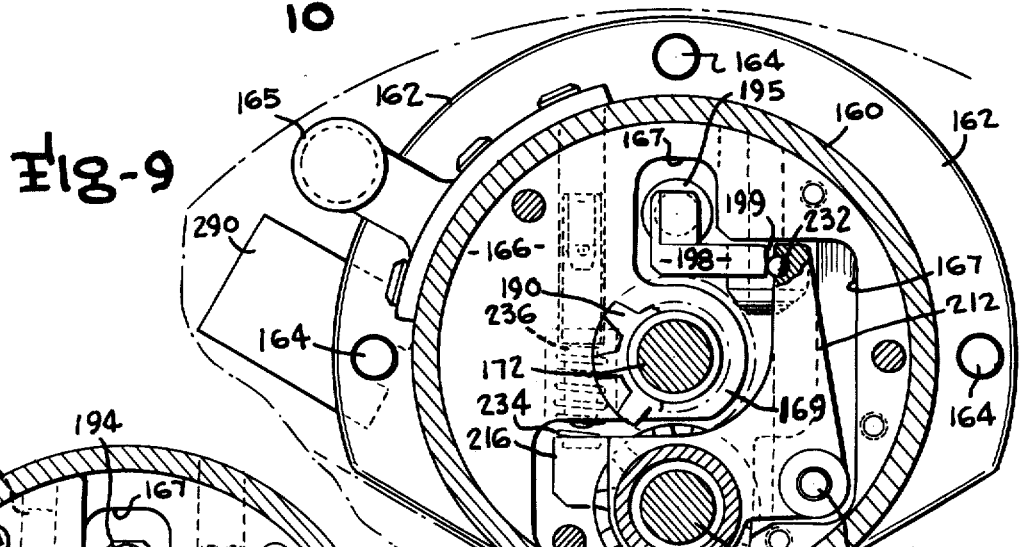
FIG. 9 is a sectional view taken along lines 9—9 of FIG. 8.
Figure 10:
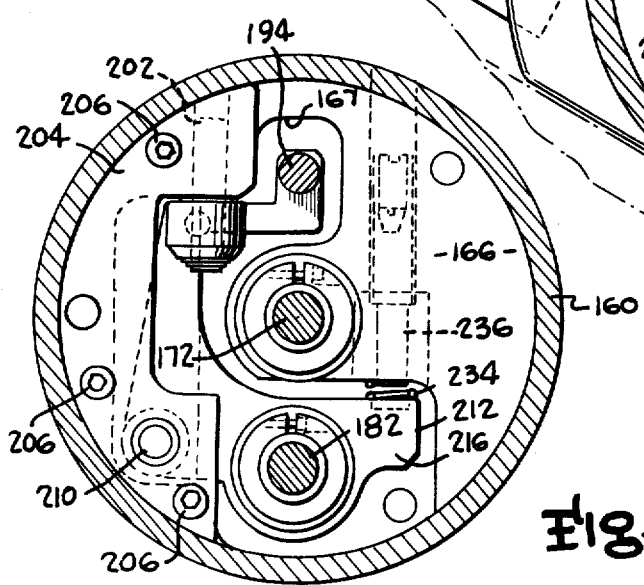
FIG. 10 is a sectional view taken along lines 10—10 of FIG. 8.
Figure 12:
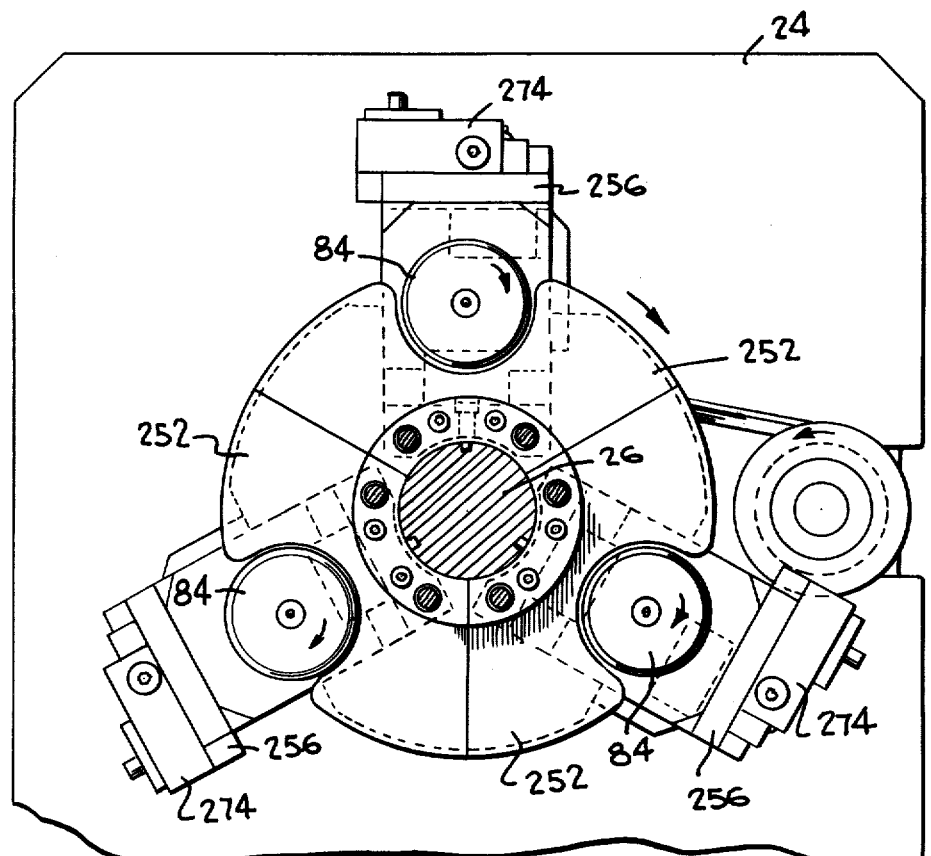
FIG. 12 is a sectional view taken along lines 12—12 of FIG. 1.

The foregoing movement of blade 178 with respect to blade 176 is effected by the swinging movement of rocker arm 198 about the axis of its pivot pin 200 with the rocker arm 198 engaging a low friction steel ball 230 positioned in a mating detent 232 in the upper end of the rockable cutter shaft support 212. Surface 199 of the rocker arm 198 engages the opposite side of the steel ball 230 as best shown in FIG. 9. Rockable cutter shaft support 212 is spring urged in a counter-clockwise direction as viewed in FIG. 9 by a compression spring 234 engaging the upper surface of first arm portion 214 and mounted on an adjustable means 236 for varying the force with which the rockable cutter shaft support 212 is urged in a clockwise direction as viewed in FIG. 10 or a counter-clockwise direction as viewed in FIG. 9. Consequently, the action of spring 234 will serve to maintain the steel ball 230, detent opening 232 and surface 199 in forceful engagement so that the inward and outward movement of the pusher pin 194 will effect a reciprocating swinging movement of the pusher rockable cutter shaft support 212 about the axis of pivot pin means 210. The foregoing action will obviously result in swinging movement of the blade 178 into and out of contact with the blade 176.

Rotary drive for rotating the blades 176 and 178 respectively about the axes of shafts 172 and 182 is provided by the male drive element 192 which is matingly received in the female drive socket 104 on the end of cutter drive shaft 102 which is driven by gear 98 as previously discussed. Consequently, the axially fixed rotary cutter shaft 172 is rotated about its own axis and pinion 190 thereon is meshed with a similar pinion 238 on the shaft 182 to provide rotary drive for shaft 182. It should be observed that the pinions 190 and 238 are always in mesh for all positions of the swingable shaft 182 so that the knife elements 176 and 178 are continuously driven in opposite directions.

Figure 7:
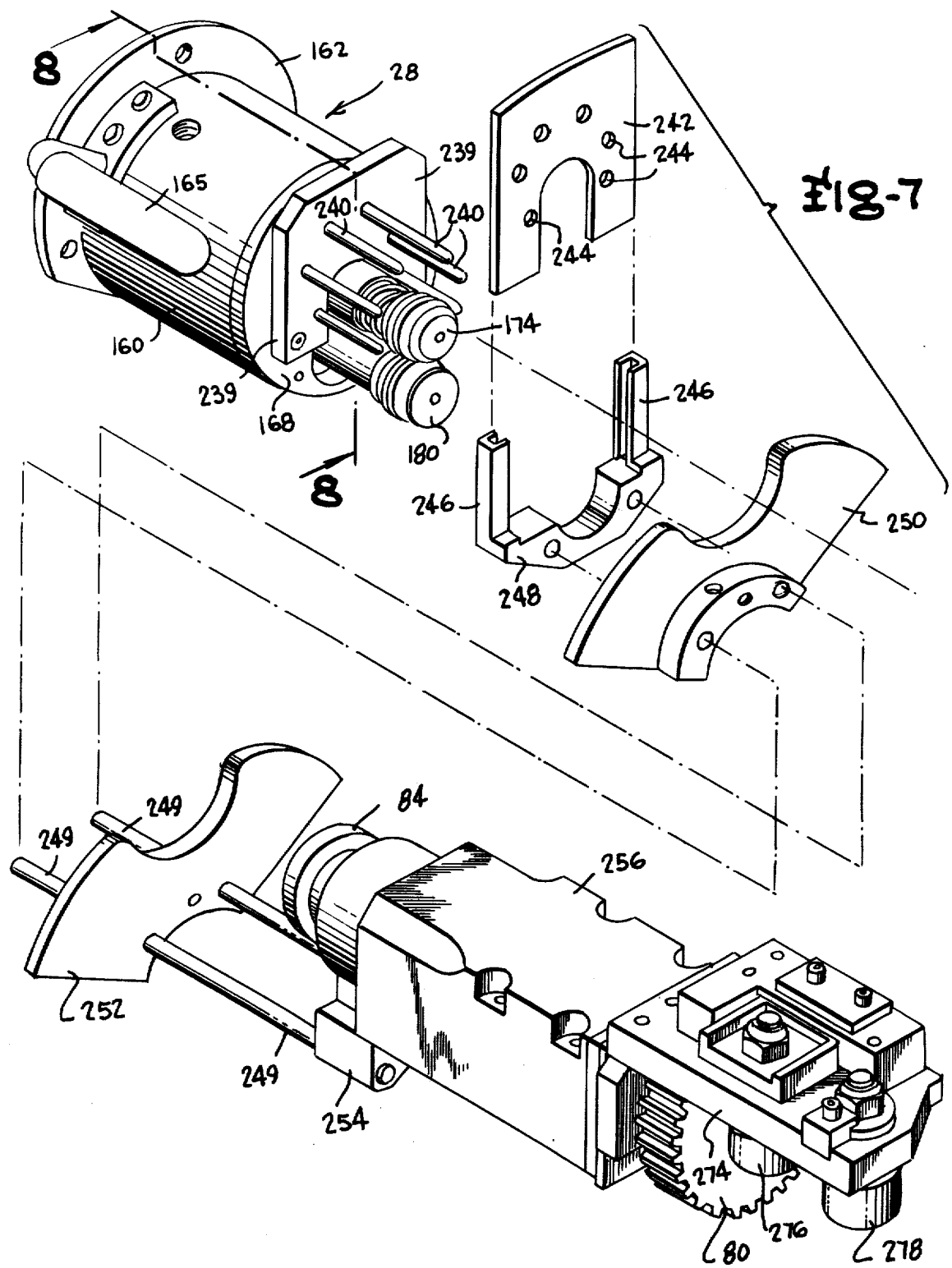
FIG. 7 is an exploded perspective view of a modular cutter head unit and mounting means therefor of the preferred embodiment.

A stripper pin support block 239 is attached to the end wall 168 and supports a plurality of stripper pins 240 as shown in FIG. 7. A stripper plate 242 provided with a plurality of apertures 244 each of which is slidingly fitted over one of the stripper pins 240 with the plate 242 being removably positioned in vertical slots in parallel arms 246 of a U-shaped carrier bracket 248 attached to the ends of two carrier rods 249. Carrier rods 249 are slidably supported in first and second can cradle plates 250 and 252 which plates are attached to the shaft 26 as shown in FIG. 2-A.

It is to be understood that the carrier rods 249 are mounted for reciprocation with respect to the can cradle plates 250 and 252 and are fixedly connected on their ends opposite carrier bracket 248 to lug means 254 extending from a vacuum chuck supporting housing 256 in which the chuck shaft 82 is mounted for rotation.

Figure 14:
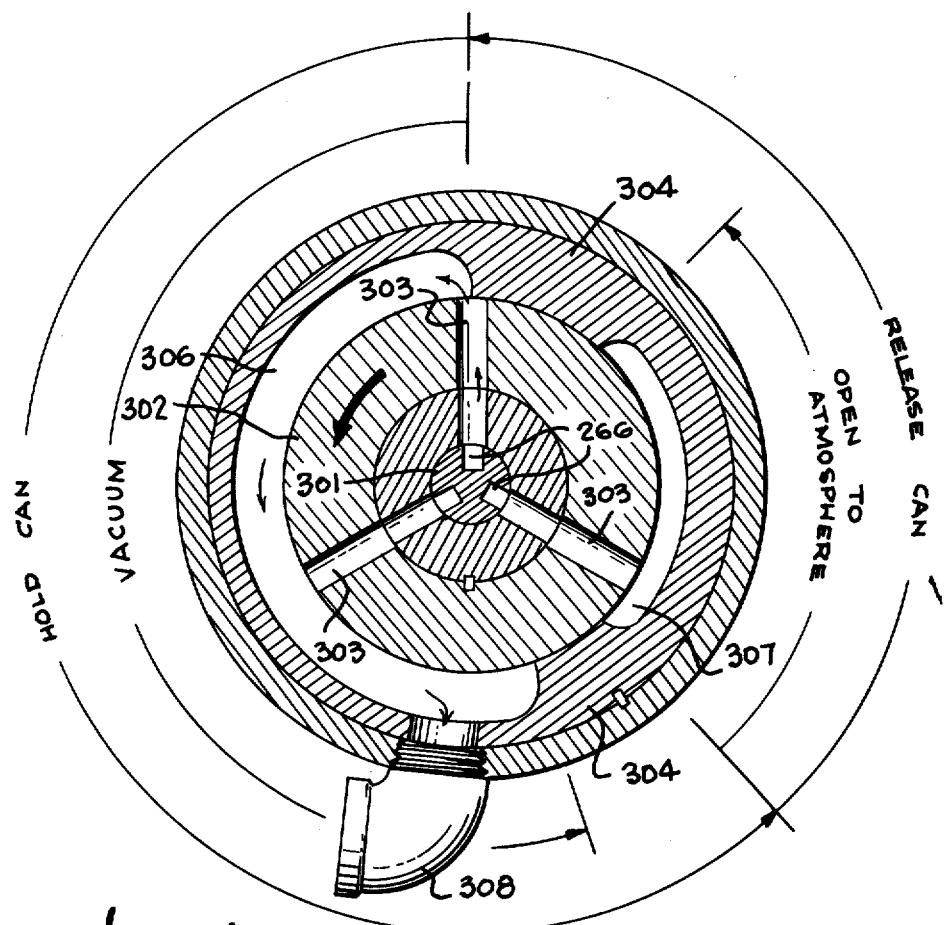
FIG. 14 is a sectional view taken along lines 14—14 of FIG. 2-B.

Each shaft 82 is mounted in a hollow chamber 258 in a sleeve 260 with shaft 82 having an axial passageway 86 communicating with chuck 94 on one end and a radial passageway 262 on an opposite end which is in communication with an elongated vacuum chamber connected by passageway 267 to passageway 266 comprising a longitudinal slot in a vacuum distribution shaft 301 (FIG. 14) matingly received in an axial bore in shaft 26. A rotary valve disc 302 keyed to shaft 301 has radial passageways 303 and has its peripheral surface engaged with a carbon seal 304 mounted in a housing 305 defining a vacuum chamber 306 and an atmospherically vented chamber 307. Vacuum chamber 306 is connected to a vacuum source by coupling 308 so that rotation of disc 302 connects the chucks 84 to the vacuum or to the vented chamber 307 at required times in the cycle of operation for each revolution of shaft 26 with seal 304 being rotationally adjustable about the axis of shaft 26 to adjust the timing of the vacuum application and venting of chucks 84.

The vacuum chuck supporting housing 256 is reciprocated axially with respect to shaft 26 by means of a cam follower roller carrier plate 274 on which first and second cam follower rollers 276 and 278 are mounted for rotation while engaged with opposite sides of a fixedly positioned chuck reciprocating cam 280 attached to the pillar plate 24. It will be observed that the opposite end of the cam follower roller carrier plate 274 is fixedly connected to the housing 256, sleeve 260 etc. for effecting reciprocation thereof with such reciprocation causing the vacuum chuck drive gear 80 to move along the length of the chuck drive gear ring 78 which is of substantially greater axial extent than gear 80. Consequently, gear 80 is always in mesh with the gear ring 78 so that rotary drive is constantly provided to the chuck shaft 82 while it is being constantly reciprocated axially. Movement of the vacuum chuck 84 to the left toward cutter unit cartridge as viewed in FIGS. 1 and 2-B serves to move an untrimmed can member 287, the base of which is carried by the chuck over the axially fixed blade 176.

In operation, the conventional can feeder means 55, which can be of conventional type such as shown in U.S. Pat. No. 3,977,358, feeds untrimmed can members 284 onto can cradle plates 250 and 252 with their open ends facing the associated cutter unit cartridge 28. Positioning of the untrimmed can on the cradle plates is simultaneous with the application of vacuum to the chuck 84 so that the chuck attracts the bottom 286 of the can against the chuck. Since the chuck is constantly rotating, the can immediately begins to spin about its own axis. Cam 280 moves the chuck 84 and the attached can to the left so that the open can end moves over blade 176 so that the can body is positioned between the cutter blades 176 and 178 which are spaced as shown in FIG. 8. However, continuous rotation of the shaft 26 causes the cam 90 to push the push rod 194 inwardly to effect movement of blade 178 into cutting contact with blade member 176 to trim the can end 287 in an obvious manner.

The trimming of the can end is effected quite rapidly due to the rotation of the knife members and the blade member 178 is swung away from blade 176 and the cutter units are then moved apart by operation of cutter control cam 90 and the vacuum chuck is reciprocated to the right as viewed in FIG. 1 by the action of cam 280 to the position of the lowermost chuck illustrated in FIG. 1. The retracting movement of the vacuum chuck also serves to move the stripper plate 242 to the right to a position in which it strips the trimmed end portion 287 of the can from pins 240. Additionally, the trimmed can is dropped from the chuck by termination of the vacuum to the chuck by the valve disc 302 as the chuck and its associated mounting unit move to their extreme rightmost position of movement under the control of the chuck reciprocating cam 280. The completed trimmed can is then released into a receptacle or to a conveyor as required by the particular installation.

Figure 13:
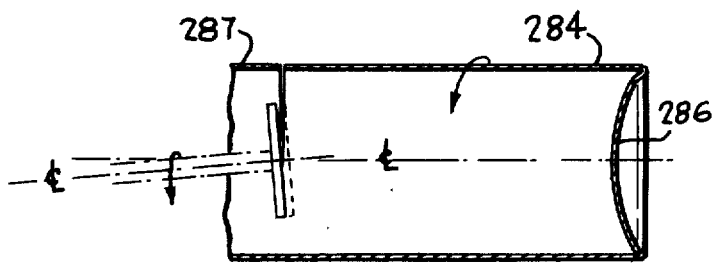
FIG. 13 is a bisecting sectional view of a can illustrating the optional positioning of cutting knives employed in trimming the can by operation of the preferred embodiment.

Another aspect of the invention resides in the fact that the cutter housing 160 etc. and the cutter blades and their mounting shafts are usually canted with respect to the axis of the can body 284 (which is parallel to the axis of shaft 26) as shown in FIG. 13 by up to two degrees to eliminate an outside burr from the can body to achieve a smoother cut than is possible with the axis of the can body and the cutter blade support shafts being parallel. This small amount of canted orientation of the axes of the cutter blade support shafts 172 and 182 with respect to the axis of the can is achieved by the simple expedient of a shim 290 mounted between the head flange 162 and the turret plate 100 as shown in FIG. 9. In actual practice, shims ranging between 0.001" and 0.250" thickness can be used with a head flange having a diameter of 7⅞" with different thickness shims providing optimum results in accordance with the size and material of the can being cut. However, in some instances, the shim 290 will not be used and the cutter blades will consequently rotate about axes parallel to the axis of the can being cut.

It is also possible to reverse the axial positions of the cutter knife blades 176 and 178 so as to change the direction of any burr resulting from the cutting operation. Such a change requires the use of knife supporting shafts of slightly different lengths for permitting the reversing of the axial position of the knife members 176 and 178. The burr can be caused to extend either inwardly with respect to the can or outwardly with respect to the can. FIGS. 2A and 8 illustrate respectively the two different possible knife positions; when the blades are positioned as shown in FIG. 2-A, the burr will be formed on the side of the can while the reverse blade positioning of blades 176 and 178 illustrated in FIG. 8 results in a burr extending radially outwardly from the can.

Thusly, the preferred embodiment is of uniquely simple, yet rugged construction, and is of particular advantage over prior known can trimmer devices in occupying substantially less space to permit a greater number of cutter units to be positioned within a given diameter and in the ease with which the cutter unit cartridges can be removed for repair and/or replacement. Such removal of the cutter unit cartridges is easily achieves by simply removing the machine screws 164 followed by lifting movement of the unit from the machine. The fact that the stripper plate 242 is mounted in the slot formed in arms 246 permits the stripper plate to be easily lifted outwardly with the associated cutter unit cartridge in an obvious manner.

Numerous modifications of the preferred embodiment will undoubtedly occut to those of skill in the art and it should therefore be understood that the spirit and scope of the invention is to be limited solely by the appended claims.

We claim:
1. A can end trimmer comprising:
frame means;
an elongated main support shaft mounted for rotation on said frame means;
a source of power;
power transmission means extending between said source of power and said main support shaft;
a removable cutter unit cartridge removably mounted on said main support shaft for unitary attachment thereto or removal therefrom, said cutter unit cartridge including:
a housing;
an axially fixed rotary knife shaft;
an axially fixed rotary cutter knife mounted on one end of said axially fixed rotary knife shaft;
a transversely shiftable rotary knife shaft having an axis parallel to said axially fixed rotary knife shaft;
a transversely shiftable rotary cutter knife mounted on one end of said transversely shiftable rotary knife shaft;
shaft shifting means for moving said transversely shiftable rotary knife shaft to effect movement of said transversely shiftable cutter knife into and out of cutting permitting engagement with said axially fixed rotary cutter knife;
coupling transmission means extending between said axially fixed rotary knife shaft and said transversely shiftable rotary knife shaft for effecting rotation of said cutter knives in unison;
shaft actuator means mounted for reciprocation on said main support shaft in a direction parallel to the axis of said main support shaft and engaged with said shaft shifting means for actuating said shaft shifting means;
means for reciprocating said shaft actuator means parallel to the axis of said main support shaft in a timed cyclic manner in response to rotation of said main support shaft to resultantly effect timed movement of said transversely shiftable rotary cutter knife into and out of engagement with said axially fixed rotary cutter knife;
a knife driving means on said support shaft drivingly engaged with said axially fixed rotary knife shaft for effecting rotation of said cutter knives; and cyclically operated can feeding, holding and handling means for positioning cylindrical cans to be trimmed in cutting position and for discharging said cans following the completion of the trimming operation.
2. The invention of claim 1 wherein said means for reciprocating said shaft actuator includes:
a fixedly positioned cutter knife control cam; and a cam follower mounted for rotation with said main support shaft and engaging said cutter knife control cam.
3. The invention of claim 1 additionally including:
a radial turret plate mounted on said main support shaft for unitary rotation therewith; and cartridge attachment means removably mounting said cutter cartridge unit on said radial turret plate.
4. The invention of claim 1 additionally including:
a radial turret plate mounted on said main support shaft for unitary rotation therewith; and
wherein said means for reciprocating said shaft actuator includes:
a fixedly positioned cam; and
a cam follower mounted on said radial turret plate for rotation therewith; and
further including cartridge attachment means removably mounting said cutter cartridge unit on said radial turret plate.
5. The invention of claim 4 wherein cutter cartridge unit housing includes:
a cylindrical shell portion oriented with its axis substantially parallel to the axis of said main support shaft;
a head flange oriented substantially perpendicularly to the axis of said cylindrical shell portion and connected to one end of said cylindrical shell portion; and
an end wall attached to the end of said cylindrical shell opposite said head flange;
and wherein said attachment means comprises machine screw means attaching said head flange to said radial turret plate.

6. The invention of claim 5 wherein said shaft shifting means comprises:

a push rod having an inner end and an outer end and being mounted for axial reciprocation in and extending through said head flange; a rocker arm mounted for rocking pivotal movement about a pivot axis substantially perpendicular to the axis of said cylindrical shell portion and positioned in engagement with said inner end of said push rod to be pivoted by reciprocation thereof;

a rockable cutter shaft support mounted for pivotal movement about a pivot axis substantially parallel to the axis of said cylindrical shell portion;

driving connection means between said rocker arm and said rockable cutter shaft support for effecting rocking movement of said cutter shaft support in response to rocking movement of said rocker arm;

rotary bearing means mounted on said rockable cutter shaft support; and said transversely shiftable cutter shaft being mounted in said rotary bearing means.

7. The invention of claim 6 wherein said cutter unit cartridge additionally includes:

a plurality of stripper pins extending outwardly from said end wall; and a stripper plate mounted for reciprocation on said stripper pins; and wherein said cyclically operated can feeding holding and handling means includes:

a vacuum chuck supporting housing;

a vacuum chuck mounted for rotation about an axis parallel to the axis of said main support shaft in said vacuum chuck supporting housing;

means for reciprocating said vacuum chuck housing toward and away from said rotary cutter knives for moving cans into and out of cutting relation to said knives;

a stripper plate carrier bracket having first and second parallel arms having mutually facing slots to removably receive said stripper plate; and carrier bracket support means supporting said carrier bracket and connected to said vacuum chuck supporting housing so that reciprocation of said vacuum chuck supporting housing effects simultaneous reciprocation of said stripper plate.

8. The invention of claim 1 wherein said cyclically operated can feeding, holding and handling means includes:

a vacuum chuck supporting housing mounted for reciprocation between first and second positions parallel to the axis of the main support shaft;

a vacuum chuck mounted on said vacuum chuck supporting housing in facing relation to said fixed cutter knife for rotation about an axis parallel to the axis of said main support shaft;

said fixed cutter knife being positioned to be inside the path of the can wall when said vacuum chuck supporting housing is moved to its first position; and means for reciprocating said vacuum chuck housing toward said cutter unit cartridge to effect positioning of a can end held by said chuck over said fixed cutter knife so that the fixed cutter knife is inside the can to permit trimming of the can end and in a reverse direction away from said cutter unit to effect the removal of the trimmed can from the cutter blade area.

9. The invention of claim 8 wherein said means for reciprocating said shaft actuator includes:

a fixedly positioned cutter knife control cam; and a cam follower mounted for rotation with said main support shaft in engagement with said cutter knife control cam.

10. The invention of claim 8 additionally including:

a radial turret plate mounted on said main support shaft for unitary rotation therewith; and wherein said means for reciprocating said shaft actuator includes:

a fixedly positioned cam; and a cam follower mounted on said radial turret plate for rotation therewith; and further including cartridge attachment means removably mounting said cutter cartridge unit on said radial turret plate.

11. The invention of claim 10 wherein cutter cartridge unit housing includes:

a cylindrical shell portion oriented with its axis substantially parallel to the axis of said main support shaft;

a head flange oriented substantially perpendicularly to the axis of said cylindrical shell portion and connected to one end of said cylindrical shell portion; and an end wall attached to the end of said cylindrical shell opposite said head flange;

and wherein said attachment means comprises machine screw means attaching said head flange to said radial turret plate.

12. The invention of claim 11 wherein said shaft shifting means comprises:

a pusher rod having an inner end and an outer end and being mounted for axial reciprocation in and extending through said head flange;

a rocket arm mounted for rocking pivotal movement about a pivot axis substantially perpendicular to the axis of said cylindrical shell portion and positioned in engagement with said inner end of said push rod to be pivoted by reciprocation thereof;

a rockable cutter shaft support mounted for pivotal movement about a pivot axis substantially parallel to the axis of said cylindrical shell portion;

driving connection means between said rocker arm and said rockable cutter shaft support for effecting rocking movement of said cutter shaft support in response to rocking movement of said rocker arm;

rotary bearing means mounted on said rockable cutter shaft support; and said transversely shiftable cutter shaft being mounted in said rotary bearing means.

13. A can end trimmer comprising:

frame means;

a turret plate mounted for rotation about a horizontal axis on said frame means;

power means for rotating said rotary turret plate;

a plurality of cutter unit cartridges removably supported on one side of said turret plate;

each of said cutter unit cartridges including:

a housing having a head flange engaged with one side of said turret plate;

a vacuum chuck mounted on said vacuum chuck supporting housing for rotation about an axis parallel to the axis of rotation of said turret plate; and means for reciprocating said vacuum chuck toward its associated cutter unit cartridge to effect positioning of a can to be trimmed over said axially fixed cutter knife so that the axially fixed cutter knife is inside the can to be trimmed and for subsequently reciprocating the can away from the associated cutter unit following trimming of the can to effect the removal of the trimmed can from the cutter blade area.

14. The invention of claim 13 additionally including shaft canting means for orienting the axes of rotation of said cutter knives at an angle less than one degree canted from a line parallel to the axes of rotation of said vacuum chucks.

15. The invention of claim 14 wherein said shaft canting means includes shim means positioned between said turret plate and the head flanges of said cutter unit cartridges.

16. The invention of claim 15 wherein said cutter knife actuators are each reciprocated by cyclic drive means which includes:
   a fixedly positioned cam;
   cam follower means engaged with said fixedly positioned cam and mounted on said radial turret plate for rotation therewith,
   a first axially fixed rotary cutter knife; a second transversely shiftable rotary cutter knife;
   knife shifting means for moving said transversely shiftable rotary cutter knife into and out of cutting permitting engagement with said axially fixed rotary cutter knife;
   a rotary power input member;
   power transmission means extending between said rotary power input member, said axially fixed rotary cutter knife and said transversely shiftable rotary cutter knife for effecting rotation of said knives in unison about parallel axes;
   a plurality of cyclically driven cutter knife actuator means each mounted for reciprocation on said turret plate adjacent an associated cutter unit cartridge in a direction toward and away from the head flange and having one end engaged with the knife shifting means on its associated cutter unit cartridge for cyclically actuating said knife shifting means to resultantly effect timed movement of the transversely shiftable rotary cutter knife into and out of engagement with said axially fixed rotary cutter knife of the associated cutter unit cartridge;
   a main rotary support member supporting said turret plate for rotation; and
   a plurality of vacuum chuck assemblies each respectively mounted on said main rotary support member and associated with and facing an associated cutter unit cartridge with each of said vacuum chuck assemblies including:
   a vacuum chuck supporting housing;
   a pusher member mounted for reciprocation in said turret plate and having one end engaged with said cam follower means to be reciprocated thereby and having an opposite end facing and drivingly engaging said knife shifting in the associated cutter unit cartridge.

17. The invention of claim 16 wherein each of said knife shifting means includes:
   a push rod having an axis and an inner end and an outer end mounted for axial reciprocation in and extending through said head flange with the outer end of said push rods engaging the opposite end of the associated pusher member;
   a rocker arm mounted for rocking pivotal movement about a pivot axis substantially perpendicular to the axis of said pusher rod to be pivoted by reciprocation thereof;
   a rockable cutter shaft support mounted for pivotal movement about a pivot axis substantially parallel to the axis of rotation of said cutter knives;
   driving connection means between said rocker arm and said rockable cutter shaft support for effecting rocking movement of said cutter shaft support in response to rocking movement of said rocker arm;
   cutter shaft bearing means on said rockable cutter shaft support;
   a transversely shiftable cutter shaft mounted in said cutter shaft bearing means; and
   means attaching said second transversely shiftable rotary cutter knife to one end of said transversely shiftable cutter knife shaft.

18. A can cutter for trimming the end of a cylindrical can comprising:
   can support means supporting the can for rotation about its axis;
   drive means for rotating said can support means;
   a first circular cutter blade;
   a second circular cutter blade;
   drive means for rotating said first and second blades in opposite directions;
   blade support means for supporting said first and second cutter blades for rotation about parallel canted axes that are canted no more than 1° with respect to the axis of said cylindrical can and for supporting one of said cutter blades for movement of said one cutter blade into and out of cutting permitting overlapping relationship with the other blade, said blade support means including:
   a turret plate mounted for rotation about an axis parallel to the axis of said can;
   a housing mounted on said turret plate;
   a pair of parallel cutter shafts mounted for rotation in said housing with each shaft respectively providing coaxial support for one of said cutter blades;
   shaft shifting means in said housing for moving one of said shafts transversely with respect to its axis;
   shim means positioned between said housing and said turret plate for effecting the canting of said cutter blades with respect to the axis of the can;
   a turret mounted for rotation about an axis parallel to the axis of said can;
   a housing mounted on said turret plate;
   a pair of parallel cutter shafts mounted for rotation in said housing with each shaft respectively providing coaxial support for one of said cutter blades;
   shaft shifting means in said housing for moving one of said shafts transversely with respect to its axis; and
   shim means positioned between said housing and said turret plate for effecting the canting of said cutter blades with respect to the axis of the can.

* * * * *